United States Patent
Bauer et al.

(10) Patent No.: US 6,250,875 B1
(45) Date of Patent: Jun. 26, 2001

(54) HEATER

(75) Inventors: Hans-Jürgen Bauer, Elsbethen (AT); Bernhard Teufel, Plankenfels; Günter Kilian, Schöntal-Aschhausen, both of (DE); Andreas Bilek, Graz (AT)

(73) Assignees: Audi AG, Ingolstadt; Rota System AG, Waischenfeld, both of (DE)

(*) Notice: Subject to any disclaimer, the term of this patent is extended or adjusted under 35 U.S.C. 154(b) by 0 days.

(21) Appl. No.: 09/468,115

(22) Filed: Dec. 21, 1999

(30) Foreign Application Priority Data

Dec. 24, 1998 (DE) .............................. 198 60 149

(51) Int. Cl.[7] ............................................. B60H 1/03
(52) U.S. Cl. ............................................. 415/10; 392/315
(58) Field of Search ............................. 415/10; 392/311, 392/315, 317, 323; 417/207

(56) References Cited

U.S. PATENT DOCUMENTS 3,666,917 * 5/1972 Oglesby ............................ 392/311

FOREIGN PATENT DOCUMENTS

| 196 00 735 | 7/1997 | (DE) . |
| 0313764 | 5/1989 | (EP) . |
| 9910971 | 3/1999 | (WO) . |

OTHER PUBLICATIONS

Martin et al., "Kuhlmittelpumpe mit degressivem Forderverhalten",.

* cited by examiner

*Primary Examiner*—John E. Ryznic
(74) *Attorney, Agent, or Firm*—Browdy & Neimark

(57) ABSTRACT

A heater comprises a casing, which has an interior chamber. It further comprises a rotor, which is formed as an impeller on the one hand and as an eddy-current disk on the other, and a magnet support, which is equipped with permanent magnets and disposed non-rotarily in the casing and which is displaceable into an operating position in the direct neighborhood of the eddy-current disk and into a position of rest spaced therefrom. The eddy-current disk and the magnet support equipped with permanent magnets are rinsed by water.

12 Claims, 3 Drawing Sheets

HEATER

BACKGROUND OF THE INVENTION

1. Field of the Invention

The invention relates to a heater.

2. Background Art

EP 0 313 764 A2 teaches a heater, which comprises a component fitted with permanent magnets and joined to a rotor shaft which is mounted for rotation in a casing. Individual soft iron cores are disposed in the casing. A heat transfer medium, in particular cooling water, flows around the soft iron cores inside the casing. Practice has shown that this arrangement helps translate mechanical energy into heat only to a very limited extent.

An eddy-current brake is known from the lexicon "Maschinenbau, VDI Verlag 1995, ISBN 3-401372-3, page 1430", which is an electric brake of non-contact operation, translating mechanical energy into heat by eddy currents in a metallic mass. By design the eddy-current brake is an internal-pole-type d.c. generator. In this case, a stationary inner ring supports a coil through which passes direct current and which produces a homopolar magnetic field. An armature ring of electrically conductive material constitutes the active part of a rotor. Upon rotation of the rotor relative to a stator, eddy currents are induced in the armature ring, cooperating with the stator field to produce a braking moment, the range of which depends on the exciting current and the slip speed. Eddy-current brakes of this type are employed among others in trucks as an additional brake on the propeller shaft.

A heater is known from PCT application WO99/10971 (no prior publication), having a casing with an interior chamber, a cooling-water supply connector and a cooling-water discharge connector opening into the interior chamber. A rotatably drivable rotor shaft is mounted for rotation in the casing. Two component parts are provided, which are coaxial to the axis and one part of which is provided with permanent magnets, while the other part is a closed ring of electrically conductive material disposed at least partially in the interior chamber. One of these parts is non-rotatably disposed as a rotor on the rotor shaft. The parts are rotary relative to each other, leaving a gap between the permanent magnets and the part of electrically conductive material.

DE 196 00 735 A teaches a cooling-water pump for an internal combustion engine, which comprises a bearing casing for the shaft of an impeller. A belt pulley is mounted on the outer end of the shaft. A heater, which is embodied as a so-called Visco-heater, is disposed as a substantially independent additional set on the bearing casing.

SUMMARY OF THE INVENTION

It is an object of the invention to embody a heater in such a way that it is especially simple in structure and thus operationally reliable.

According to the invention, this object is attained in a heater comprising a casing, which has an interior chamber; a cooling-water suction line and a cooling-water discharge line, each of which opening into the interior chamber; a rotatably drivable rotor shaft which is rotatably mounted in the casing, having a central longitudinal axis; a rotor, which is mounted non-rotatably on the rotor shaft and on which are formed an impeller for the conveyance of cooling water from the cooling-water inlet to the cooling-water outlet and an eddy-current disk of electrically conductive material, of an eddy-current heater; a magnet support, which is provided with permanent magnets and is non-rotary in the casing and which is displaceable in the direction of the axis into a position of rest at a distance a from the eddy-current disk, and into an operating position with a very narrow gap being left between the eddy-current disk and the permanent magnets. The measures according to the invention ensure in a simple way that the permanent magnets can be shifted between a position of rest with no or only irrelevant residual induction taking place in the eddy-current disk and an operating position with eddy currents being induced in the eddy-current disk. The magnet support and the permanent magnets situated thereon are not dynamically loaded.

Especially advantageous measures for the displacement of the magnet support between its position of rest and its operating position consist in that the magnet support is displaceable against a compression spring from the position of rest into the operating position; in that at least one linear drive is provided for displacement of the magnet support from the position of rest into the operating position; and in that the at least one linear drive is a hydraulically actuated piston-cylinder drive. Instead of hydraulically actuated piston-cylinder drives, use can also be made of so-called thermoactuator elements as linear drives, which are controlled by the temperature of the cooling-water; they have the drawback of working by analogy to the temperature of the cooling-water and not between two discrete positions. Furthermore, commercial electric stepping motors having a spindle nut drive may be used as linear drives.

Advantageous embodiments of the magnet support consist in that the magnet support is a magnet supporting ring; and in that the magnet support is displaceably guided against rotation on a hub of the casing. Excellent heat transfer from the entire heater to the cooling water is attained in an embodiment wherein the interior chamber is divided by the rotor into a pump room and a partial casing chamber, which houses the eddy-current heater; and wherein the pump room and the partial casing chamber are interconnected by a channel. A way of how the heater and its pump can be integrated in an internal combustion engine, simultaneously serving as a cooling-water pump thereof, consists in that the casing comprises a first partial casing and a second partial casing, the second partial casing being formed in the casing of a water-cooled internal combustion engine; and in that the pump room and the impeller are substantially disposed in the second partial casing.

Further features, advantages and details of the invention will become apparent from the ensuing description of an exemplary embodiment, taken in conjunction with the drawing.

DESCRIPTION OF THE PREFERRED EMBODIMENT

Figure 2:
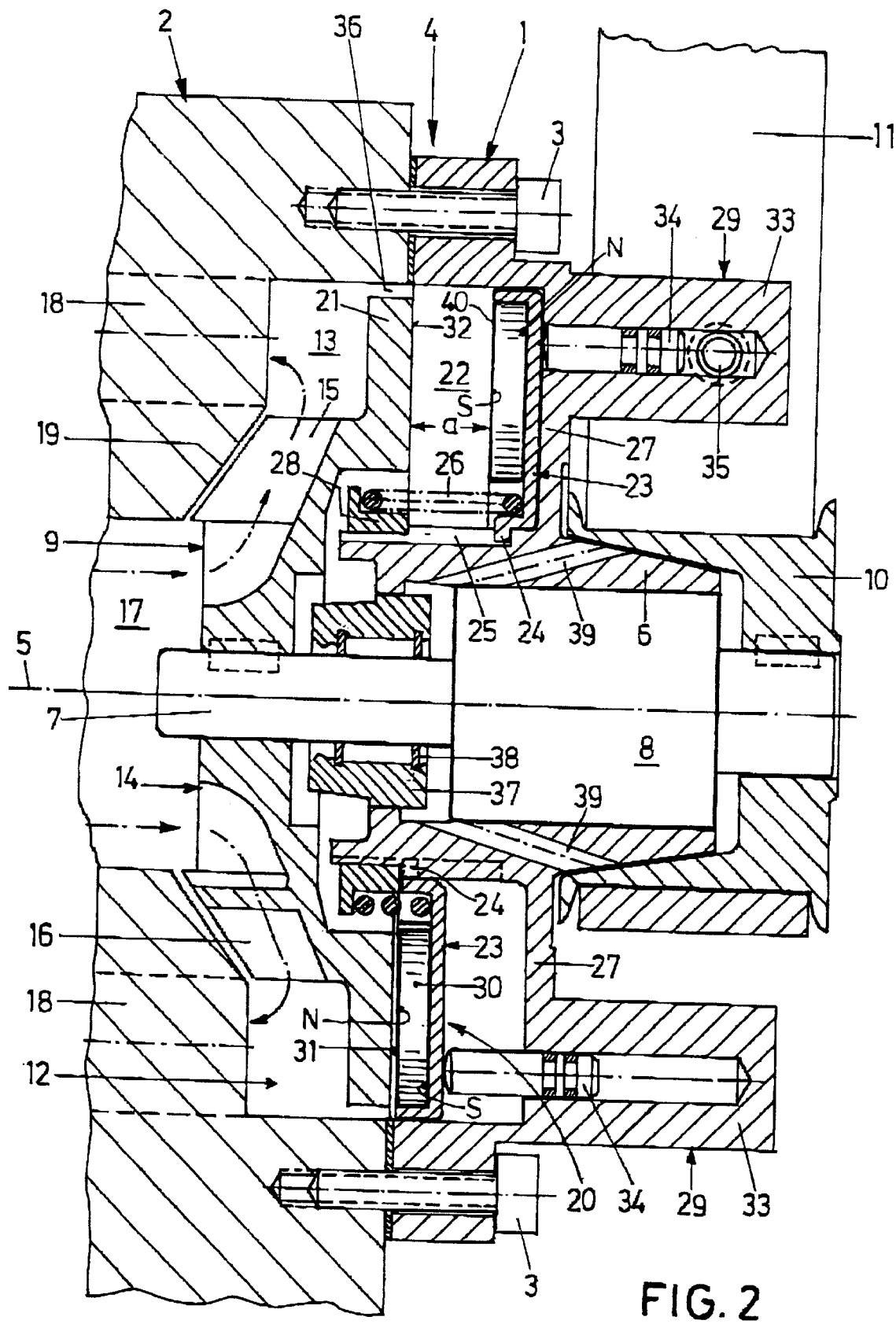
FIG. 2 is a cross-section through the heater on the line II in FIG. 1 on an enlarged scale as compared to FIG. 1.

The heater seen in the drawing is integrated in a cooling-water pump. It has a first partial casing 1, which is joined to a second partial casing 2 by means of screws 3. The second partial casing 2 is formed by the casing of a water-cooled internal combustion engine. The partial casings 1, 2 constitute a casing 4. A hub 6 is formed on the partial casing 1 concentrically of the central longitudinal axis 5 of the casing 4; a rotor shaft 7 is rotatably run in the hub 6 by means of a bearing 8. A rotor 9 is mounted against rotation on the rotor shaft 7 at the end thereof located outside the second partial casing 2. A belt pulley 10 is mounted against rotation on the rotor shaft 7 at the end thereof located outside the first partial casing 1; actuation of the rotor shaft 7 and thus of the rotor 9 is effected via his belt pulley 10 from the engine by means of a belt 11. As seen in FIG. 2, the belt pulley 10 largely overlaps the hub 6, which helps obtain a very compact construction. An interior casing chamber 12 is formed in the casing 4, namely in the two partial casings 1, 2. The part of this interior chamber 12 that is located within the partial casing 2 is a pump room 13 housing the part of the rotor 9 which is an impeller 14 turned towards the partial casing 2. The impeller 14 is a radial impeller. It has blades 15 of radial tangential extension, defining between them conduits 16. The supply of water takes place through a suction line 17 which is formed in the partial casing 2 and extends concentrically of the axis 5. The water is conveyed from the suction line 17 through the conduits 16 radially tangentially outwards to the pressure side, where it is discharged through two discharge lines 18, which are also formed in the partial casing 2. The casing wall 19 of the partial casing 2 that is allocated to the impeller 14 is adapted to the shape of the blades 15 and forms a limiting wall of the conduits 16.

An eddy-current heater 20 is formed in the partial casing 1 concentrically of the axis 5. It comprises an annular eddy-current disk 21, which works as an inductor and constitutes an outer annular section of the rotor 9 and is formed on the pressure side of the impeller 14. At least the disk 21—but as a rule the entire rotor 9—consists of electrically conductive material, for instance of copper or aluminum. An annular magnet supporting ring 23 of magnetizable material such as iron having a cross section in the shape of a C is disposed for displacement in the direction of the axis 5 in an annular partial casing chamber 22 of the interior casing chamber 12, the annular partial casing chamber 22 being formed in the first partial casing 1 in alignment with the disk 21. On its radially inward side, the magnet supporting ring 23 is provided with guide projections 24, which engage with corresponding grooves 25 of the hub 6 so that the supporting ring 23 is centered relative to the axis 5 and is displaceable in the direction of the axis 5 on the hub 6, but non-rotatable relative thereto. The supporting 23 cannot rotate together with the rotor 9. The supporting ring 23 is loaded by a pre-stressed helical compression spring 26 in such a way that it is pushed away from the eddy-current disk 21 into a position of rest spaced therefrom and seen at the top of FIG. 2, in which it bears against an outside wall 27 of the first partial casing 1. To this end, the compression spring 26 supports itself on a stop ring 28, which is mounted on the hub 6 within the disk 21.

The supporting ring 23 can be displaced by linear drives 29 and against the force of the compression spring 26 into a second position seen at the bottom of FIG. 2, which is the operating position. In this operating position, permanent magnets 30, which are disposed in the magnet supporting ring 23 in a manner distributed along the circumference thereof, define a gap 31 of few tenths of a millimeter at maximum towards the plane front surface 32, turned thereto, of the disk 21.

The linear drives 29 are hydraulically actuated piston-cylinder drives, the cylinders 33 being formed on the partial casing 1 and a piston 34 being sealed and guided therein, bearing against the supporting ring 23. A hydraulic line 35 opens into each cylinder 33. Hydraulic actuation is tiggered via solenoid valves, which are again triggered by he central electronic control of the engine.

The direction of magnetization of the permanent magnets 30 is parallel to the axis 5. The magnets 30 are mounted at equal angular distances on the supporting ring 23 in such a way that a north pole and a south pole are alternately turned towards the front surface 32 of the disk 21. The magnets 30 may also be a ring in which magnetized areas of alternating directions of magnetization are formed at equal angular distances.

An annular channel 36 is formed between the circumference of the disk 21 and the partial casing 2 for the cooling water to be able to flow also into the partial casing chamber 22 allocated to the heater 20. A sealing casing 37, which envelops the shaft 7, is formed in the hub 6 at the end thereof that is turned towards the rotor 9; seals 38 are disposed in the casing 37, bearing against the shaft 7. Leaking-water channels 39, which lead outwards, discharge between the sealing casing 37 and the bearing 8.

The magnets 30 are sealed towards the cooling water by a film 40 of non-magnetic material, for instance a Cr—Ni alloy or titanium or aluminum, which is fixed to the supporting ring 23 for instance by welding.

Figure 1:
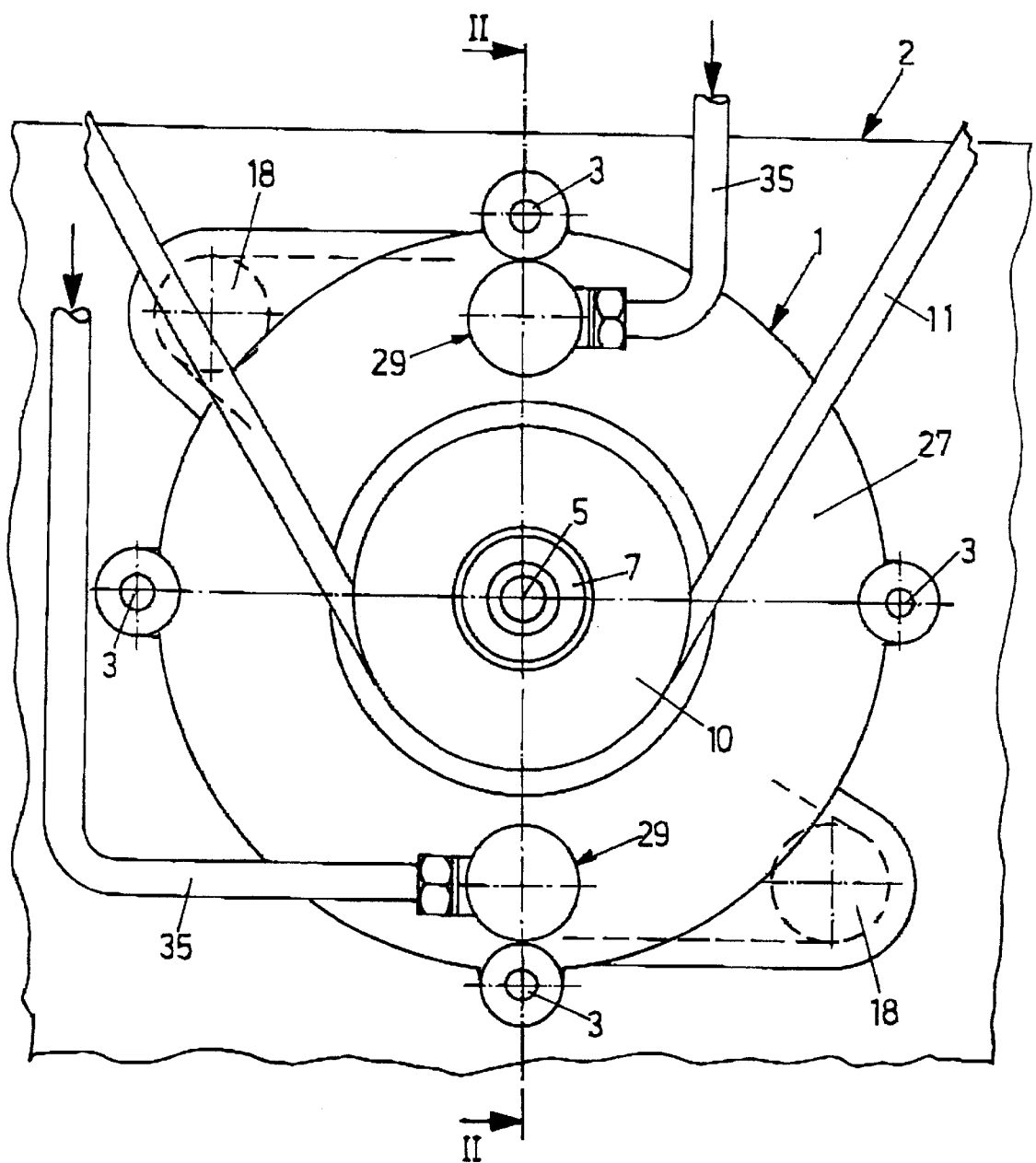
FIG. 1 is a plan view of a heater according to the invention.

When the engine runs, the cooling-water pump also runs, i.e. the rotor 9 and the impeller 14 always work. When the linear drives 29 are not actuated hydraulically and the ring 23, which supports the permanent magnets 30, is in the position of rest seen at the top of FIG. 1, the distance a of the permanent magnets 30 from the front surface 32 of the eddy-current disk 21 is dimensioned such that no or no substantial induction takes place in the disk 21. If however the linear drives 29 are hydraulically actuated, then the supporting ring 23 is shifted until it bears against the stop ring 28. In this operating position the mentioned gap 31 forms between the front surface 32 and the percent magnets 30. Eddy currents are induced in the disk 21, which is moved relative to the magnets 30 and in particular relative to the magnetic fields thereof; they lead to the disk 21 being strongly heated. This heat is transmitted to the cooling water.

Figure 3:
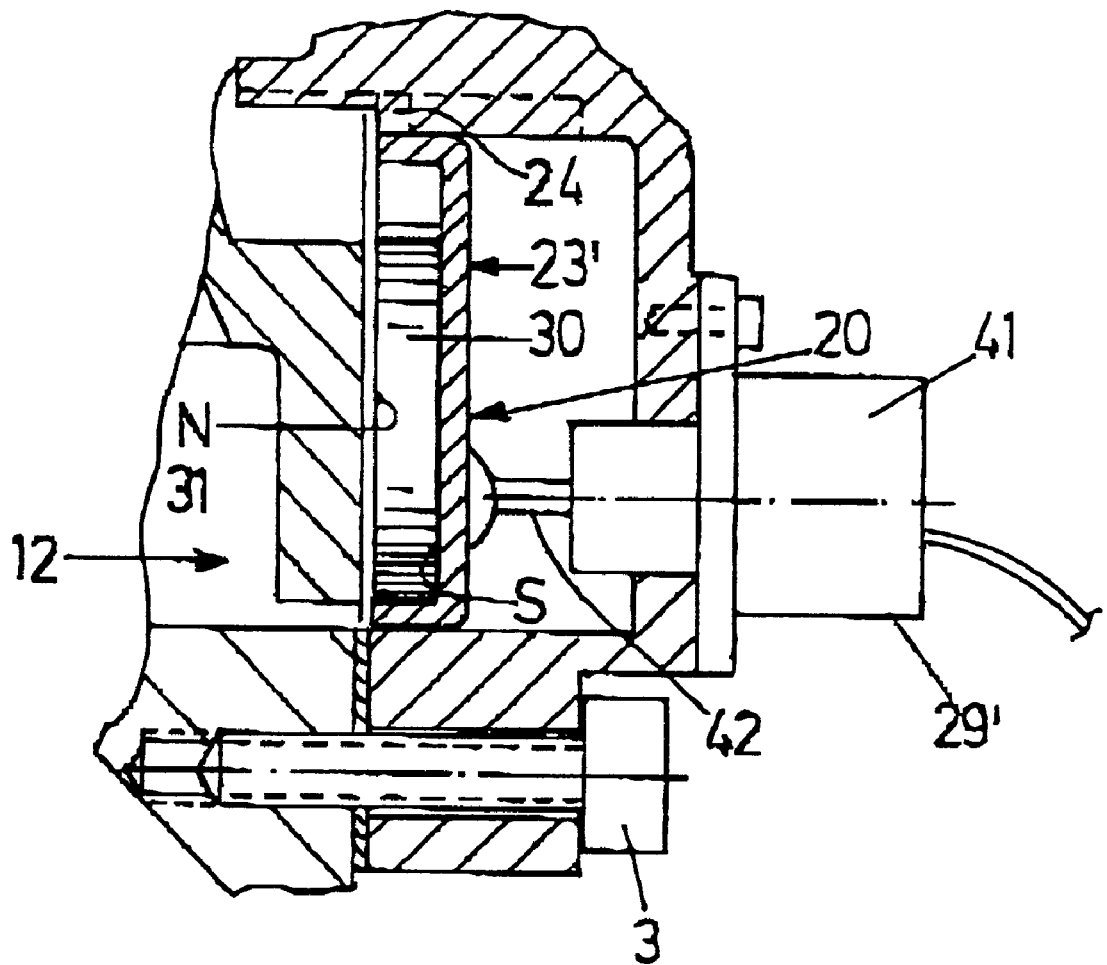
FIG. 3 a partial section through the heater according to FIG. 2 comprising a modified linear drive.

As can be seen from FIG. 3, as a linear drive 29' an electric stepping motor 41 can also be provided, being provided with a spindle drive 42, which is arranged on the magnet supporting ring 23' so that the resetting of the magnet supporting ring 23' from the position shown at the bottom of FIG. 2 into the position shown at the top of FIG. 2 is carried out by means of the spindle drive 42. Therefore, in this case the helical compression spring provided in the embodiment according to FIG. 2 is not necessary.

What is claimed is:

1. A heater comprising
   a casing (4), which has an interior chamber (12);
   a cooling-water suction line (17) and a cooling-water discharge line (18), each of which opening into the interior chamber (12);
   a rotatably drivable rotor shaft (7), which is rotatably mounted in the casing (4), having a central longitudinal axis (5);
   a rotor (9), which is mounted non-rotatably on the rotor shaft (7) and on which are formed
      man impeller (14) for the conveyance of cooling water from the cooling-water inlet (17) to the cooling-water outlet (18) and
      an eddy-current disk (21) of elementally conductive material, of an eddy-current heater (20);
   a magnet support (23), which is provided with permanent magnets (30) and is non-rotary in the casing (4) and which is displaceable in the direction of the axis (5)

into a position of rest at a distance a from the eddy-current disk (21), and into an operating position with a very narrow gap (31) being left between the eddy-current disk (21) and the permanent magnets (30).

2. A heater according to claim 1, wherein the magnet support (23) is displaceable against a compression spring (26) from the position of rest into the operating position.

3. A heater according to claim 1, wherein at least one linear drive (29) is provided for displacement of the magnet support (23) from the position of rest into the operating position.

4. A heater according to claim 3, wherein the at least one linear drive (29) is a hydraulically actuated piston-cylinder drive.

5. A heater according to claim 1, wherein the magnet support is a magnet supporting ring (23).

6. A heater according to claim 1, wherein the magnet support (23) is displaceably guided against rotation on a hub (6) of the casing (4).

7. A heater according to claim 1, wherein the interior chamber (12) is divided by the rotor (9) into a pump room (13) and a partial casing chamber (22), which houses the eddy-current heater (20); and wherein the pump room (13) and the partial casing chamber (22) are interconnected by a channel (36).

8. A heater according to claim 1, wherein the casing (4) comprises a first partial casing (1) and a second partial casing (2), the second partial casing (2) being formed in a motor casing of a water-cooled internal combustion engine.

9. A heater according to claim 7, wherein the casing (4) comprises a first partial casing (1) and a second partial casing (2), the second partial casing (2) being formed in a motor casing of a water-cooled internal combustion engine; and wherein the pump room (13) and the impeller (14) are substantially disposed in the second partial casing (2).

10. A heater according to claim 3, wherein the at least one linear drive (29) is an electric stepping motor.

11. A heater according to claim 1, wherein the magnets (30) are sealed towards the cooling water.

12. A heater according to claim 10, wherein the electric stepping motor (41) is provided with a spindle drive (42), which is secured to the magnet support(23').

* * * * *